United States Patent
Vaezi Joze et al.

(10) Patent No.: US 11,526,972 B2
(45) Date of Patent: Dec. 13, 2022

(54) SIMULTANEOUSLY CORRECTING IMAGE DEGRADATIONS OF MULTIPLE TYPES IN AN IMAGE OF A FACE

(71) Applicant: Microsoft Technology Licensing, LLC, Redmond, WA (US)

(72) Inventors: Hamidreza Vaezi Joze, Redmond, WA (US); Rajeev Yasarla, Baltimore, MD (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/164,755

(22) Filed: Feb. 1, 2021

(65) Prior Publication Data

US 2022/0245776 A1 Aug. 4, 2022

(51) Int. Cl.
| | |
|---|---|
| *G06T 5/50* | (2006.01) |
| *H04N 19/85* | (2014.01) |
| *G06V 40/16* | (2022.01) |
| *G06T 5/00* | (2006.01) |
| *H04N 5/243* | (2006.01) |
| *H04N 7/15* | (2006.01) |

(52) U.S. Cl.
CPC .............. *G06T 5/50* (2013.01); *G06T 5/002* (2013.01); *G06T 5/003* (2013.01); *G06V 40/161* (2022.01); *G06V 40/168* (2022.01); *G06V 40/172* (2022.01); *H04N 5/243* (2013.01); *H04N 7/15* (2013.01); *H04N 19/85* (2014.11); *G06T 2207/10016* (2013.01); *G06T 2207/20221* (2013.01); *G06T 2207/30201* (2013.01)

(58) Field of Classification Search
CPC .. G06T 5/50; G06T 5/00; G06T 5/002; G06T 5/003; H04N 19/85; H04N 5/243; H04N 7/15; G06K 9/00
USPC ............................................ 348/14.01–14.16
See application file for complete search history.

(56) References Cited

U.S. PATENT DOCUMENTS

| | | | | |
|---|---|---|---|---|
| 2015/0365627 | A1* | 12/2015 | Deng | G06T 13/80 348/14.07 |
| 2021/0076002 | A1* | 3/2021 | Peters | G06V 40/20 |
| 2021/0152735 | A1* | 5/2021 | Zhou | G06N 3/0454 |

OTHER PUBLICATIONS

Li et al,. AllinOneBadWeatherRemovalUsingArchitecturalSearch,InProceedingsoftheIEEE/CVFConferenceonComputerVisionandPatternRecognition, Jun. 2020,pp. 3175-3185.).*
Gatys, et al., "Image Style Transfer Using Convolutional Neural Networks", In Proceedings of IEEE Conference on Computer Vision and Pattern Recognition, Jun. 27, 2016, pp. 2414-2423.

(Continued)

*Primary Examiner* — Melur Ramakrishnaiah
(74) *Attorney, Agent, or Firm* — Calfee, Halter & Griswold LLP

(57) ABSTRACT

Described herein are technologies related to correcting image degradations in images. An image is received, and values for features that are usable to correct for image degradation associated with blur, noise, and low light conditions are generated by separate encoders based upon the received image. A fusion network learned by way of network architecture search fuses these values, and the fused values are employed to generate an improved image, such that the image degradations associated with blur, noise, and low light conditions are simultaneously corrected.

20 Claims, 9 Drawing Sheets

(56) References Cited

OTHER PUBLICATIONS

Johnson, et al., "Perceptual losses for real-time style transfer and super-resolution", In European conference on computer vision, Oct. 8, 2016, pp. 1-18.

Li, et al., "Aod-net: All-in-one dehazing network", In Proceedings of the IEEE international conference on computer vision, 2017, pp. 4770-4778.

Li, et al., "Enhanced Blind Face Restoration With Multi-Exemplar Images and Adaptive Spatial Feature Fusion", In Proceedings of the IEEE/CVF Conference on Computer Vision and Pattern Recognition, Jun. 14, 2020, pp. 2706-2715.

Li, et al., "Rainflow: Optical flow under rain streaks and rain veiling effect", In Proceedings of the IEEE International Conference on Computer Vision, Oct. 27, 2019, pp. 7304-7313.

Liu, et al., "Auto-deeplab: Hierarchical neural architecture search for semantic image segmentation", In Proceedings of the IEEE conference on computer vision and pattern recognition, Jun. 15, 2019, pp. 82-92.

Liu, et al., "DARTS: Differentiable Architecture Search", In Repository of arXiv:1806.09055, Jun. 24, 2018, 13 Pages.

Pan, et al., "Deblurring face images with exemplars", In European conference on computer vision, Sep. 6, 2014, pp. 47-62.

Parkhi, et al., "Deep Face Recognition", Published in British Machine Vision, vol. 1, Issue 3, Sep. 7, 2015, 12 Pages.

Shen, et al., "Deep semantic face deblurring", In Proceedings of the IEEE Conference on Computer Vision and Pattern Recognition, 2018, pp. 8260-8269.

Yasarla, et al., "Deblurring face images using uncertainty guided multi-stream semantic networks", In Journal of IEEE Transactions on Image Processing, vol. 29, Apr. 30, 2020, pp. 1-13.

Zhang, et al., "Densely connected pyramid dehazing network", In Proceedings of the IEEE conference on computer vision and pattern recognition, Jun. 18, 2018, pp. 3194-3203.

Chrysos, et al., "Motion deblurring of faces", In Repository of arXiv:1803.03330v1, Mar. 8, 2018, pp. 1-23.

Kupyn, et al., "DeblurGAN: Blind Motion Deblurring Using Conditional Adversarial Networks", In Proceedings of the EEE/CVF Conference on Computer Vision and Pattern Recognition, Jun. 18, 2018, pp. 8183-8192.

Lau, et al., "ATFaceGAN: Single Face Image Restoration and Recognition from Atmospheric Turbulence", In Repository of arXiv:1910.03119v1, Oct. 7, 2019, 8 Pages.

Lore, et al., "LLNet: A Deep Autoencoder Approach to Natural Low-light Image Enhancement", In Journal of Pattern Recognition, vol. 61, Jan. 2017, pp. 650-662.

"International Search Report and Written opinion Issued in PCT Application No. PCT/US22/012839", dated May 25, 2022, 14 Pages.

Yasarla, et al., "Network Architecture Search for Face Enhancement", In Repository of arXiv:2105.06528v1, May 13, 2021, pp. 1-21.

KEFALAS., et al., "Speech-Driven Facial Animation Using Polynomial Fusion of Features", In Proceedings of IEEE International Conference on Acoustics, Speech and Signal Processing, May 4, 2020, pp. 3487-3491.

* cited by examiner

SIMULTANEOUSLY CORRECTING IMAGE DEGRADATIONS OF MULTIPLE TYPES IN AN IMAGE OF A FACE

BACKGROUND

Videoconferencing applications are becoming increasingly popular, where two or more people communicate in real-time by way of networked computers. In operation, a first client computing device that executes a videoconferencing application is employed by a first user who is participating in a videoconference, and a camera that is included in or coupled to the client computing device captures images of the face of the first user. The first client computing device transmits the images to a second client computing device operated by a second user who is participating in the videoconference, whereupon the images of the face of the first user are presented on a display that is coupled to or included within the second client computing device. To optimize the experience of the users participating in videoconferences, it is desirable that images of faces of other participants in the videoconference shown to such users are of high quality.

Images of faces captured during videoconferences, however, often include one or more types of degradation; for example, an image of a face of a videoconference participant may be blurry (which may be caused by motion of the videoconference participant relative to the camera that captures images of the face of such participant). In another example, the image the face of the videoconference participant may include undesirable noise, where the noise in the image may be caused by noise in a communications channel between client computing devices, may be introduced when the image is compressed, etc. In still yet another example, an environment of a videoconference participant may have poor lighting conditions (e.g., too little light), and therefore an image of the face of the videoconference participant may include degradations associated with poor lighting conditions.

Computer-executable software has been developed to improve quality of an image of a face of a user. For instance, first computer-executable software has been developed to correct for blurring in images, where such first software includes a first encoder/decoder pair; second computer-executable software has been developed to correct for noise in images, where such second software includes a second encoder/decoder pair, and third computer-executable software has been developed to correct for degradations associated with low lighting conditions, where such third software includes a third encoder/decoder pair. The aforementioned software, however, are collectively ill-suited for use in a videoconferencing environment, because each of the first, second, and third software operates independently from the others. More specifically, for example, using the above-described software to correct for multiple types of image degradation requires that an image of a face of a user must first be provided to the first software (to correct for blurring), and the resultant corrected image must then be provided to the second software (to correct for noise), and the resultant further corrected image must thereafter be provided to the third software (to correct for low lighting conditions evident in the image).

Utilizing such a sequential approach, however, is not well-suited for videoconferencing applications, as: 1) image correction performed sequentially, as described above, may not be able to be completed quickly enough to allow for each frame in a video feed to be subject to correction, and 2) a correction made by one software module may introduce an image degradation of a type that was previously corrected for by another software module. Thus, the second software module that is configured to correct for noise in an image of a face of a user may introduce degradations associated with blur into the image, where blur was previously corrected for by the first software module.

SUMMARY

The following is a brief summary of subject matter that is described in greater detail herein. This summary is not intended to be limiting as to the scope of the claims.

Described herein are various technologies relating to simultaneous correction of many types of degradation in an image (e.g., an image that includes a face of a person). Exemplary types of image degradation include blur, noise, and degradation caused by poor lighting conditions when the image was captured (such as low lighting conditions). In an example, prior to an image being subjected to correction for different types of image degradation, an identity vector for a person captured in the image can be constructed based upon several "clean" images that include the face of the person. The identity vector can include several values for features of the face of the person that are invariant (e.g., the values in the identity vector are approximately the same regardless as to whether the person has recently shaved or has facial hair, as the person ages, as hairstyle of the person changes, etc.).

Subsequent to the identity vector for the person being generated, an image that includes the face of the person is received, wherein such image may have multiple types of image degradation associated therewith (e.g., blur, noise, and/or degradation associated with low lighting conditions). Optionally, a classifier receives the image, wherein the classifier is configured to output values that are indicative of relative amounts of blur, noise, and/or degradation caused by lowlight conditions in the image. The image (and optionally the identity vector and outputs of the classifier) is provided to multiple different encoders that are respectively configured to output values for features that are employed to correct for different types of image degradation in the image. For example, the multiple encoders include: 1) a first encoder that is configured to output first values for first features in the image, wherein the first features are usable to correct for blur in the image; 2) a second encoder that is configured to output second values for second features in the image, wherein the second features are usable to correct for noise in the image; and 3) a third encoder that is configured to output third values for third features in the image, wherein the third features are usable to correct for image degradation caused by poor lighting conditions when the image was captured.

Therefore, in an example, the first encoder is provided with the image that includes the face of the person, the identity vector for the person, and a value output by the classifier that is indicative of an amount of image degradation associated with blur in the image relative to amounts of image degradation associated with noise and poor lighting conditions. Similarly, the second encoder is provided with the image that includes the face of the person, the identity vector for the person, and the value output by the classifier that is indicative of an amount of image degradation associated with noise in the image relative to amounts of image degradation associated with blur and poor lighting conditions. Finally, the third encoder receives the image that includes the face of the person, the identity vector for the person, and the value output by the classifier that is indicative of an amount of image degradation associated with poor lighting conditions in the image relative to amounts of image degradation associated with blur and noise. The three different encoders can be provided with their respective inputs in parallel and can generate their respective output feature values in parallel.

A computer-implemented fusion network receives a concatenation of the feature values output by the multiple encoders and fuses such values together to form a fused encoding of the image. As will be described in greater detail herein, the fusion network includes multiple repeatable cells, with each cell including different processing blocks that generate their own outputs. In an example, connections between cells and between blocks within cells are learned by way of network architecture search (NAS).

A decoder receives the fused encoding of the image and outputs an improved image, where the improved image includes corrections for the image degradations of multiple types that existed in the image that was provided to the encoders. It can therefore be ascertained that image degradations of multiple types are corrected for simultaneously utilizing the approach described herein. In contrast, conventional approaches for improving different types of degradation in an image require for corrections to be made sequentially rather than in parallel, such that the conventional approaches require more processing resources than the approach described herein.

In an exemplary application of the technologies described herein, frames of a video generated during a videoconference can be improved through such technologies. Because different types of image degradation are corrected for simultaneously, the technologies described herein can be employed to improve each frame of video in a videoconference, thereby improving the user experience with a videoconferencing application.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
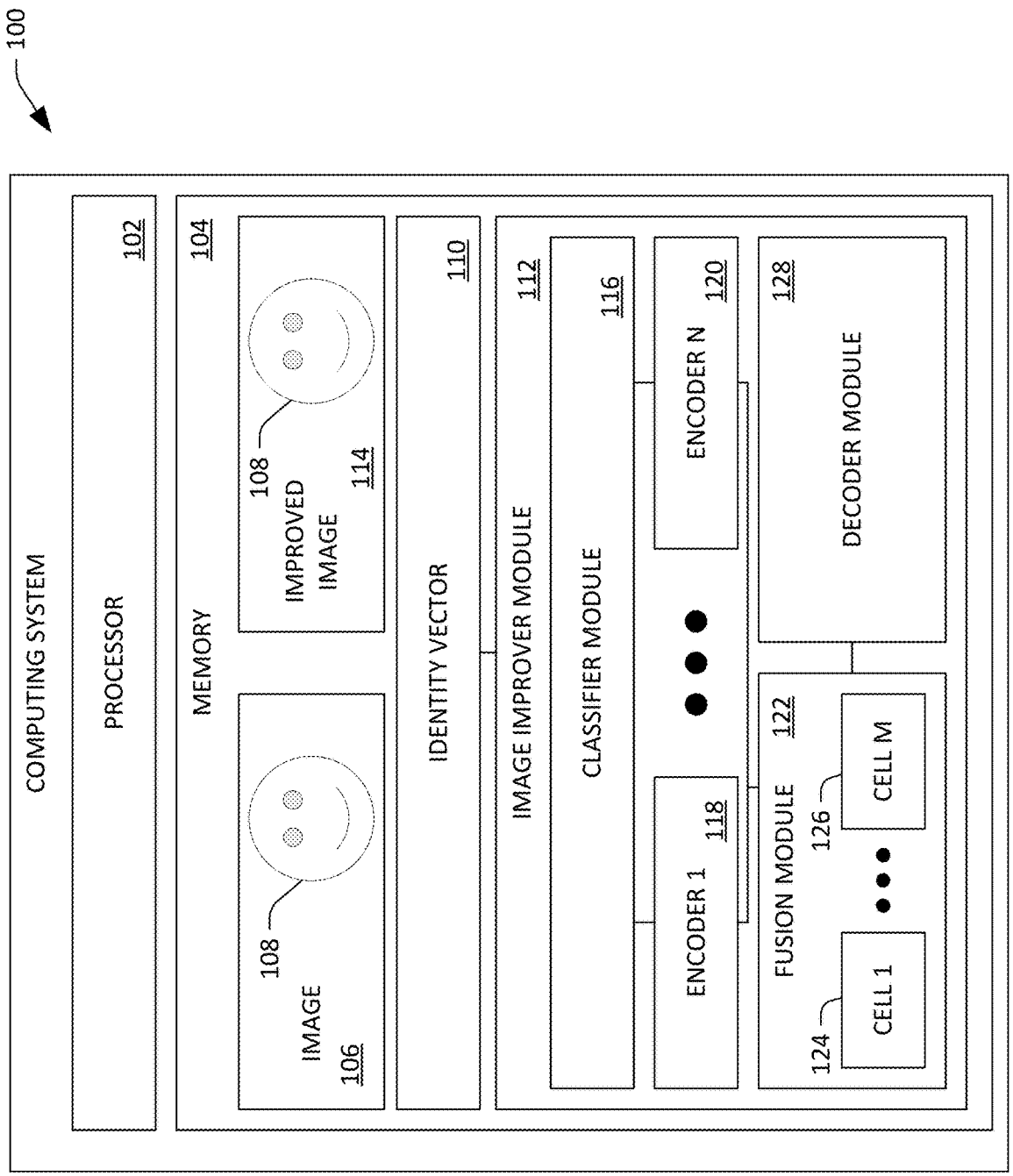
FIG. 1 is a functional block diagram of an exemplary computing system that is configured to simultaneously correct multiple types of image degradation in an image of a face of a person.

Various technologies pertaining to simultaneously correcting for multiple types of degradation in images of faces of people are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining to improving an image of a face of a person by simultaneously correcting for multiple different types of degradation in the image, wherein the different types of degradation in the image can include (but are not limited to) blur in the image, noise in the image, and degradation associated with the image being captured in poor lighting conditions (e.g., low lighting conditions). Briefly, an in accordance with technologies that will be described in greater detail below, an image of a face of a person can be provided in parallel to multiple different encoders, where each of the encoders is configured to output values for features that are employed to correct for a respective type of degradation in the image.

Thus, for example, a first encoder outputs first values for first features in the image that are used to correct blur in the image, a second encoder outputs second values for second features in the image that are used to correct for noise in the image, and a third encoder outputs third values for third features that are used to correct for degradation associated with poor lighting conditions when the image was captured. Put differently, the first encoder can output a first encoding of the image, the second encoder can output a second encoding of the image, and the third encoder can output a third encoding of the image.

A computer-implemented fusion network receives these multiple different encodings and generates a fused encoding of the image based upon the multiple different encodings. As will be described below, the fusion network can include multiple cells, wherein each cell includes several processing blocks. Network architecture search can be employed to identify connections between cells as well as couplings between processing blocks. A decoder receives the fused encoding of the image and generates an improved image based upon the fused encoding. It can therefore be ascertained that the combination of the encoders, the fusion network, and the decoder simultaneously corrects for multiple different types of image degradation that are present in the image.

In addition, an identity vector for the person can be employed in connection with generating the improved image of the face of the person. The identity vector is analogous to a fingerprint of a person, where a sequence of values in the identity vector invariantly identifies features of the person. The identity vector is generated based upon several "clean" images of the face of the person, which can be collected during a registration phase, where images of the face of the person are captured, and where such images are substantially free of blur, noise, and degradation associated with low lighting conditions. In another example, the "clean" images of the face of the person are acquired from an image library approved by the person. The encoders are trained to account for the identity vector when outputting their respective encodings, such that facial features of the person are considered when noise, blur, and degradation associated with low lighting conditions are corrected. These aspects will be described in greater detail herein.

With reference now to FIG. 1, a functional block diagram of an exemplary computing system 100 that is configured to receive an image, simultaneously correct multiple different types of degradation in the image, and output an improved image (with degradations of the multiple types corrected therein) is illustrated. The computing system 100 can be a client computing device that, for example, is used in connection with a videoconferencing application. In another example, the computing system 100 can be or include a server computing device that hosts a videoconferencing application. Other examples are contemplated.

The computing system 100 includes a processor 102 and memory 104, where the memory 104 includes data that is accessible to the processor 102 and instructions that are executed by the processor 102. The memory 104 includes an image 106, wherein the image 106 optionally includes a face 108 of a person. For example, the image 106 is generated by a camera of a client computing device when a person is participating in a videoconference by way of the client computing device. Thus, the face 108 is the face of the person participating in the videoconference.

The memory 104 can further include an identity vector 110 for the person whose face 108 is captured in the image 106. The identity vector 110 comprises a sequence of values that are collectively and invariantly indicative of an identity of the person and are further representative of features of the face 108 of the person. Generation of the identification vector 110 is described in greater detail below.

The memory 104 also includes an image improver module 112 that is configured to receive the image 106 and generate an improved image 114, where the improved image 114 includes the face 108 of the person (with multiple types of image degradation that were existent in the image 106 corrected). As will be described below, the image improver module 112 is configured to simultaneously correct for multiple different types of image degradation in the image 106 when generating the improved image 114. This is in direct contrast to conventional approaches, which require different types of image degradation to be addressed sequentially.

The image improver module 112 optionally includes a classifier module 116 that is configured to receive the image 106 and the identity vector 110 and output values that are representative of relative amounts of different types of image degradation in the image 106 of the face 108 of the person. For instance, when the image improver module 112 is configured to simultaneously correct for three different types of image degradation in the image 106, the classifier module 116 outputs a first value, a second value, and a third value, wherein the first value is representative of an amount of image degradation of the first type relative to amounts of image degradation of the second and third types in the image 106, the second value is indicative of an amount of image degradation of the second type relative to amounts of image degradation of the first and third types in the image 106, and the third value is indicative of an amount of image degradation of the third type in the image 106 relative to amounts of image degradation of the first and second types in the image 106, The image improver module 112 additionally includes several encoders 118-120, where each encoder is configured to output a respective image encoding that is usable to correct for a respective type of image degradation in the image 106. Pursuant to an example, the encoders 118-120 include a first encoder 118 that is configured to output a first image encoding that is usable to correct for blur in the image 106 of the face 108 of the person. The encoders 118-120 can further include a second encoder that is configured to output a second image encoding that is usable to correct for noise in the image 106 of the face 108 of the person. The encoders 118-120 can also include a third encoder that is configured to output a third image encoding that is usable to correct for image degradation caused by poor lighting conditions when the image 106 of the face 108 of the person was captured.

Continuing with this example, the first encoder 118 is provided with the image 106, the identity vector 110, and the first value output by the classifier module 116; the second encoder is provided with the image 106, the identity vector 110, and the second value output by the classifier module 116; and the third encoder is provided with the image 106, the identity vector 110, and the third value output by the classifier module 116. Moreover, the encoders 118-120 are provided with the image 106, the identity vector 110, and the appropriate output of the classifier module 116 in parallel such that the encoders 118-120 generate encodings of the image 106 in parallel.

The image improver module 112 also includes a fusion module 122 that receives the encodings of the image 106 output by the encoders 118-120 and generates a fused encoding of the image 106 based upon the encodings output by the encoders 118-120. The fused encoding is a set of values that, when decoded, result in image degradations of multiple types in the image 106 being simultaneously corrected. To that end, the fusion module 122 includes several cells 124-126, where each of the cells 124-126 includes a same set of processing blocks, which will be described in greater detail below. Connections between cells from amongst the cells 124-126 and connections between processing blocks in the cells 124-126 can be learned by way of network architecture search.

The image improver module 112 also comprises a decoder module 128 that receives output of the fusion module 122 (the fused encoding) and generates the improved image 114 based upon the fused encoding. The improved image 114 may then be caused to be presented on a display (e.g., instead of the image 106).

Additional detail pertaining to components of the image improver module 112 are now set forth. The classifier module 116, in example, has a suitable neural network architecture, where the classifier module 116 is trained based upon training pairs {y, c}, where y is an image and c is a vector of binary numbers, with each element in the vector representative of a respective type of image degradation. Therefore, when the image improver module 112 is configured to correct image degradations of three different types, the vector c includes three values, with each value being 1 or 0 depending upon whether the respective type of image degradation is existent in the image y. The classifier module 116 can have a softmax layer, such that output of the classifier module 116, when provided with the image 106 as input, is a distribution of values over the different types of image degradations, where the values sum to 1.

As indicated previously, the encoders 118-120 may include three different encoders that are respectively configured to output image encodings that are usable to correct for blur, noise, and degradation caused by poor lighting conditions in the image 106 (although other types of encoders are contemplated) Pursuant to an example, the first encoder 118 is employed in connection with correcting for blur in images. In an exemplary embodiment, the first encoder 118 corrects for blur based upon an estimation of a blur kernel given a blurry image, and then employs deconvolution to obtain a deblurred image. In another example, the first encoder 118 corrects for blur based upon one or more priors, such as sparsity, $L_0$ gradient prior, patch prior, manifold prior, and low-rank, where such prior is used to compute a blur kernel from a given blurry image. In yet another example, the first encoder 118 is or includes a convolutional neural network (CNN), where deblurring performed by the first encoder 118 can be blind or non-blind. Exemplary non-blind image deblurring methods assume and use some knowledge about the image blur kernel. Moreover, the first encoder 118 can extract structural information in the form of facial fucidial or key points, face exemplary masks, and/or semantic masks. Other suitable approaches are also contemplated.

The second encoder in the image improver module 112 can denoise images and can model the image prior over a noisy image and use an estimated amount of noise in the image to denoise the image. In another example, the image improver module 112 employs blind image denoising techniques, where noise is modeled using technologies such as a non-local Bayes approach and/or a low-rank mixture of Gaussians. Moreover, similar to the first encoder 118, the second encoder can be or include a CNN that is configured to output features values that can be employed to denoise an image.

The third encoder can be configured to generate an image encoding that is usable to correct for low light conditions. To that end, the third encoder can employ histogram equalization, matching region templates, contrast statistics, bilateral learning, intermediate high dynamic range (HDR) supervision, reinforcement learning, and adversarial learning. In yet another example, the third encoder employs frequency-based decomposition and an enhancement model to perform low-light enhancement. Other approaches are also contemplated. In summary, each of the encoders 118-120 is configured to output values for features that are usable to correct for different types of image degradation in images.

Figure 2:
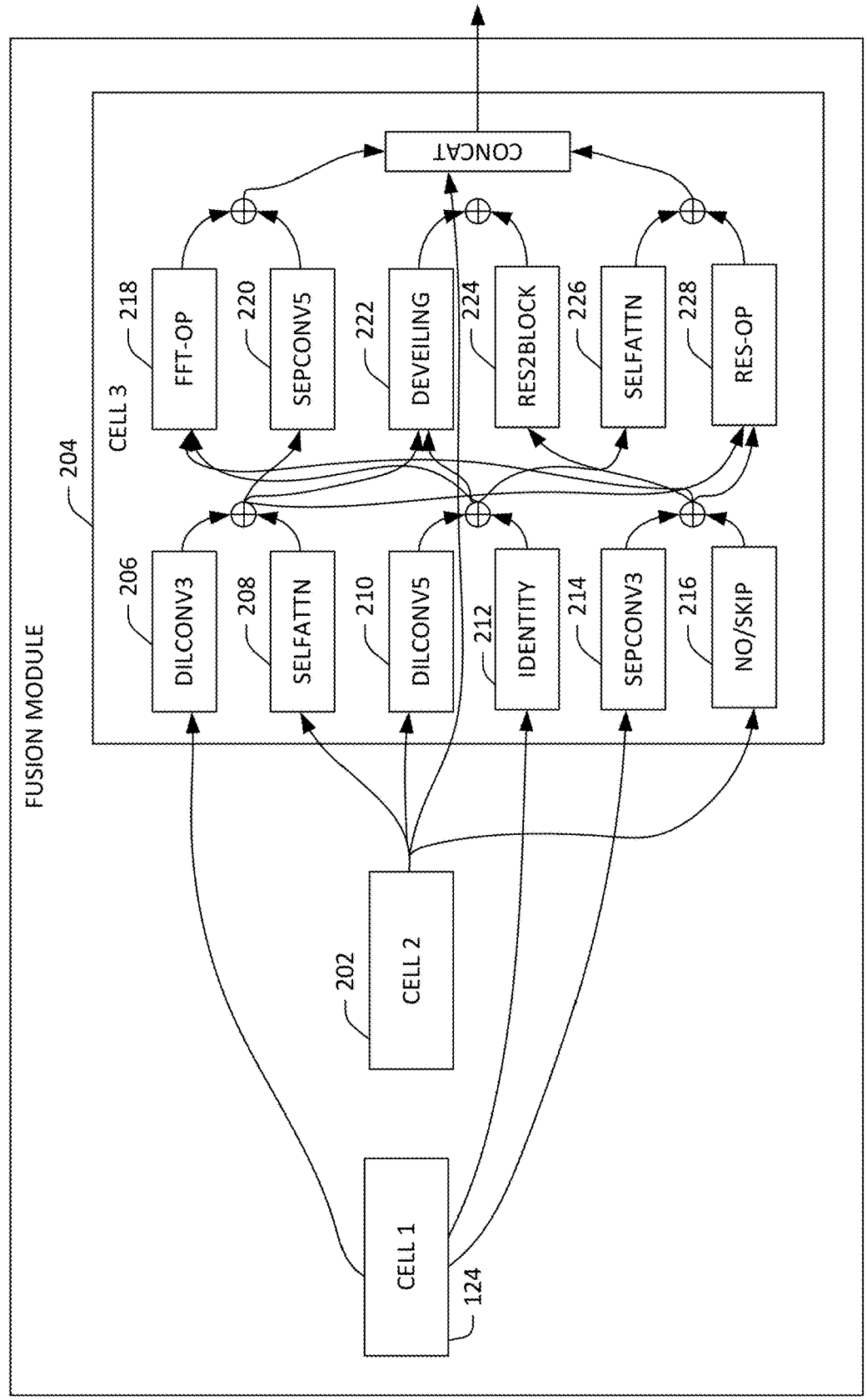
FIG. 2 is a functional block diagram of an exemplary fusion module that can receive multiple different encodings of an image and generate a fused encoding based upon such multiple encodings.

Referring now to FIG. 2, a functional block diagram of an exemplary implementation of the fusion module 122 is depicted. In the depiction of the fusion module 122 illustrated in FIG. 2, the fusion module 122 includes three cells 124, 202, and 204; it is to be understood, however, that the fusion module 122 can include more or fewer than three cells. The fusion module 122 acts as a fusion network ($F_n(.)$) and, as referenced above, fuses feature values (encodings of an image) output by the encoders 118-120. Each of the cells 124, 202, and 204 is a repeatable module, where the fusion module 122 includes several interconnected cells to create the fusion network ($F_n(.)$). A fusion cell Cell(.) can be defined as a directed acyclic graph that includes B processing blocks, where B is an integer that is greater than one. Each block i in the $l^{th}$ fusion cell $F^l$ is a two tensors to one tensor mapping structure, defined as a tuple of ($I_1, I_2, O_1, O_2$, M), where $I_1, I_2 \in \mathcal{I}_l$ are selections of input tensors, $O_1, O_2 \in \mathcal{O}$ are selections of layer types applied to corresponding input tensors, and $M \in \mathcal{M}$ is a method to combine the outputs $O_1, O_2$ to form the output tensor $Z_i^l$ of the $i^{th}$ processing block in the $l^{th}$ cell ($F_i^l$). The output $Z^l$ of the fusion cell $F^l$ is a concatenation of outputs of all processing blocks in the fusion cell $F^l$, i.e., $\{Z_1^l, Z_2^l, \ldots Z_B^l\}$. $\mathcal{I}_l$ is the set of input tensors, wherein such set includes outputs of the previous cell $F^{l-2}$ and previous previous cell $F^{l-2}$. In an example, element wise addition is used as the sole operator for combining the method in $\mathcal{M}$. Exemplary types of layers $\mathcal{O}$ include the following: 1) a 3×3 dilated convolutional layer; 2) a 5×5 dilated convolutional layer; 3) a 3×3 separable convolutional layer; 4) a 5×5 separable convolutional layer; 5) an identity layer or skipped connection; 6) a zero connection; 7) a self attention layer that is configured to compute self-attention; 8) a layer with residual-type connections (referred to as Res2Block and described below); 9) a residual operator) referred to as Res-op and described in greater detail below); 10) a deveiling layer (described in greater detail below); and 11) a Fast Fourier Transform (FFT) operator (described in greater detail below).

In the example depicted in FIG. 2, the third cell 204 includes twelve layers 206-228 (of different layer types). The first layer 206 is a 3×3 dilated convolutional layer, the second layer 208 is a self-attention layer, the third layer 210 is a 5×5 dilated convolutional layer, the fourth layer 212 is an identity layer (or skipped connection), the fifth layer 214 is a 3×3 separable convolutional layer, the sixth layer 216 is a zero connection layer, the seventh layer 218 is in FFT operator, the eighty layer 220 is a 5×5 separable convolutional layer, the ninth layer 222 is a deveiling operator, the tenth layer 224 is a Res2Block layer, the eleventh layer 226 is another self-attention layer, and the twelfth layer 228 is a Res-op layer. FIG. 2 further depicts exemplary connections between the cells 124, 202, and 204 as well as between layers in the third cell 204, wherein such connections can be learned by way of network architecture search.

The Res2Block layer 224 includes a 1×1 convolution, after which features maps are split into s feature map subsets, denoted by $x_i$, where $i \in \{1, 2, \ldots, s\}$. Each feature subset $x_i$ has the same spatial size but $$\frac{1}{s}$$

number of channels compared to the input feature map. Except for $x_i$, each $x_i$ has a corresponding 3×3 convolution, denoted as $K_i(.)$. $y_i$ denotes the output of $K_i(.)$. The future subset $x_i$ is added with the output of $K_{i-1}(.)$, and then fed into of $K_i(.)$. To reduce parameters while increasing s, the 3×3 convolution can be emitted for $x_i$. Thus, $y_i$ can be written as:

$$y_i = \begin{cases} x_1 & i = 1 \\ K_i(x_i + y_{i-1}) & 1 < i \leq s \end{cases} ; \quad (1)$$

Figure 3:
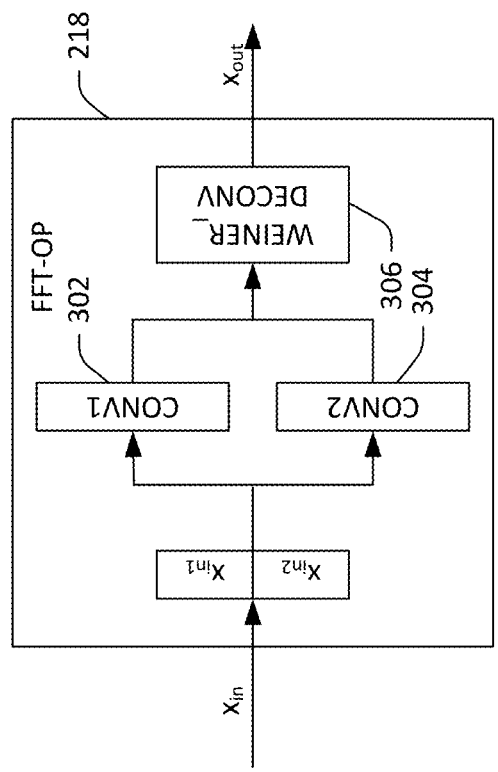

FIG. 3 is a functional block diagram of the FFT layer 218. The exemplary FFT layer 218 splits the input feature values ($x_{in}$) into two parts ($x_{in1}$ and $x_{in2}$) 301. The FFT layer 218 includes a first 3×3 convolutional layer 302, a second 3×3 convolutional layer 304, and a Weiner deconvolutional layer 306. The first convolutional layer 302 receives $x_{in1}$ and outputs $x_1$, while the second convolutional layer 304 receives $x_{in2}$ and outputs $x_2$. The Weiner deconvolutional layer 306 applies Weiner deconvolution to $x_1$ and $x_2$ to obtain $x_{out}$:

$$X_{out} = \frac{X_2 X_1}{(|X_2|^2 + \epsilon)} \quad (2)$$

where $X_1$, $X_2$, and $X_{out}$ are Fourier transforms of $x_1$, $x_2$, and $x_{out}$ respectively. $\epsilon$ resembles inverse of signal-to-noise ratio use during Weiner deconvolution, and in an example, can be set to 0.01.

Figure 4:
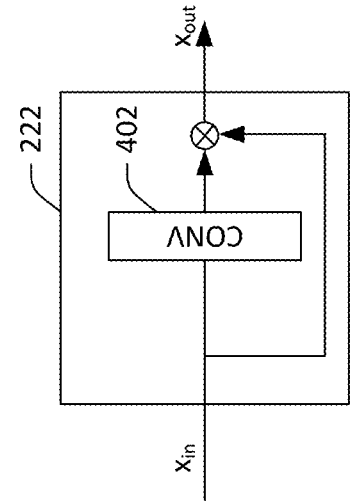
FIGS. 3-5 illustrate exemplary processing blocks that are included in a cell of the fusion model depicted in FIG. 2.

FIG. 4 depicts a functional block diagram of the deveiling, layer 222. The deveiling layer 222 includes a convolutional layer 402 (e.g., a 3×3 convolutional layer) and is configured to learn a latent mask A that enhances features from lowlight conditions as follows:

$$y = r \odot x + n \Rightarrow x = \frac{(y-n)}{r} \quad (3)$$

$$x = A \odot y, \text{ where } A = \frac{(y-n)}{ry}$$

It can be ascertained that A is a learnable mask that is a function of y, where A is learned using the convolutional layer 402 given input feature values $x_{in}$, followed by element-wise multiplication of A with $x_{in}$, resulting in generation of enhanced feature values $x_{out}$.

Figure 5:
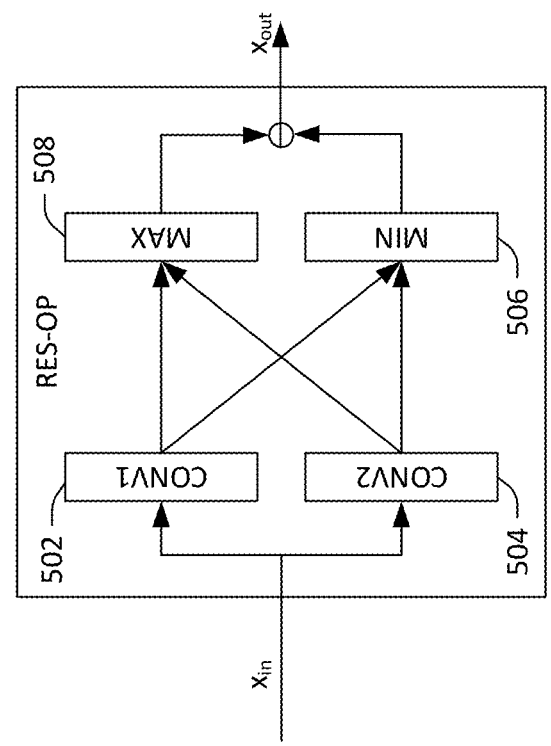

FIG. 5 is a functional block diagram of the res-op layer 228, where the res-op layer 228 includes two 3×3 convolutional layers 502 and 504, a min operator 506 and a max operator 508. Both convolutional layers 502 and 504 are provided with input feature values $x_{in}$ and outputs of the convolutional layers 502 and 504 are directed to both the min operator 506 and the max operator 508. Element-wise differences are computed to generate output feature values $x_{out}$ with reduced noise compared to $x_{in}$.

Returning to FIG. 2, and as described above, connections between cells and cell layers in the fusion module 122 can be learned through use of network architecture search. It can be ascertained that the search includes both network-level search (e.g., searching connections between different cells 124, 202, and 204 of the fusion module 122) as well as cell-level search (e.g., exploring connections between layers of different types in each fusion cell). An exemplary approach for searching for such connections is now described. With respect to the search space, every output tensor $Z_i^l$ of block $F_i^l$ is connected to all input tensors $I_i^l$ through operation $O_{j \rightarrow i}$:

$$Z_i^l = \Sigma_{Z_j^l \in I_i^l} O_{j \rightarrow i}(Z_j^l) \quad (4)$$

$\overline{O}_{j \rightarrow i}$ can be defined as an approximation of best search for operators (layers) using continuous relaxation, as follows:

$$\overline{O}_{j \rightarrow i}(Z_j^l) = \Sigma_{O^k \in \mathcal{O}} \alpha_{j \rightarrow i}^k O^k(Z_j^l), \quad (5)$$

where $\Sigma_{k=1}^{|\mathcal{O}|} \alpha_{j \rightarrow i}^k = 1$ and $\alpha_{j \rightarrow i}^k \geq 0 \forall i,j$. This can be implemented using softmax. Therefore, using Eq. 4) and Eq. 5), the fusion cell architecture can be summarized as follows:

$$Z^l = \text{Cell}(Z^{l-1}, Z^{l-2}, \alpha) \quad (6)$$

Referring again to FIG. 1, the identity vector 110 is now described in greater detail. Currently, there exists a large number of images of faces of most people that are "clean" (e.g., the images do not have a substantial amount of blur, noise, or degradations caused by poor lighting conditions). These images are often available on mobile phones, on computers, and/or in a network-accessible data repository. The identity vector for the person whose face 108 is in the image 106 can be generated from such images. Further, if several "clean" images of the face of the person are not available, "clean" images of the face of the person can be captured during a registration phase, where the person can be requested to position himself/herself in front of a camera, and several images of the face of the person (e.g., from different angles relative to the camera) can be captured, wherein such images can be employed to construct the identity vector 110. As the identity vector 110 is extracted based upon "clean" images of the face of the person, the identity vector 110 is a more reliable and a stronger prior when compared to face exemplar masks or semantic maps extracted from blurry images.

Given the degraded image 106 as input y and a corresponding set of clean images $\mathcal{D}_C$, features of the face in y and $\{C_i\} \in \mathcal{D}_C$ can be computed. These can be denoted as $F^y$ and $\{F_i^C\}$. Thereafter, adaptive instance normalization can be applied as follows:

$$\overline{F}_i^C = \sigma(F^y) \left( \frac{F_i^C - \mu(F_i^C)}{\sigma(F_i^C)} \right) + \mu(F^y) \quad (7)$$

where $\sigma(.)$ and $\mu(.)$ denote standard deviation and mean, respectively. Adaptive instance normalization can be applied before passing the identity vector 110 as input to the encoders 118-120, since the clean images $\{C_i\} \in \mathcal{D}_C$ may have different styles (as such images may be taken in different scenarios and thus may contain information that is not usable for an image restoration task). The mean of these $F_i^C$ can be defined as the identity vector 110 $I_{iden}$=mean({$F_i^C$}) and used as input along with y to the encoders 118-120.

Figure 6:
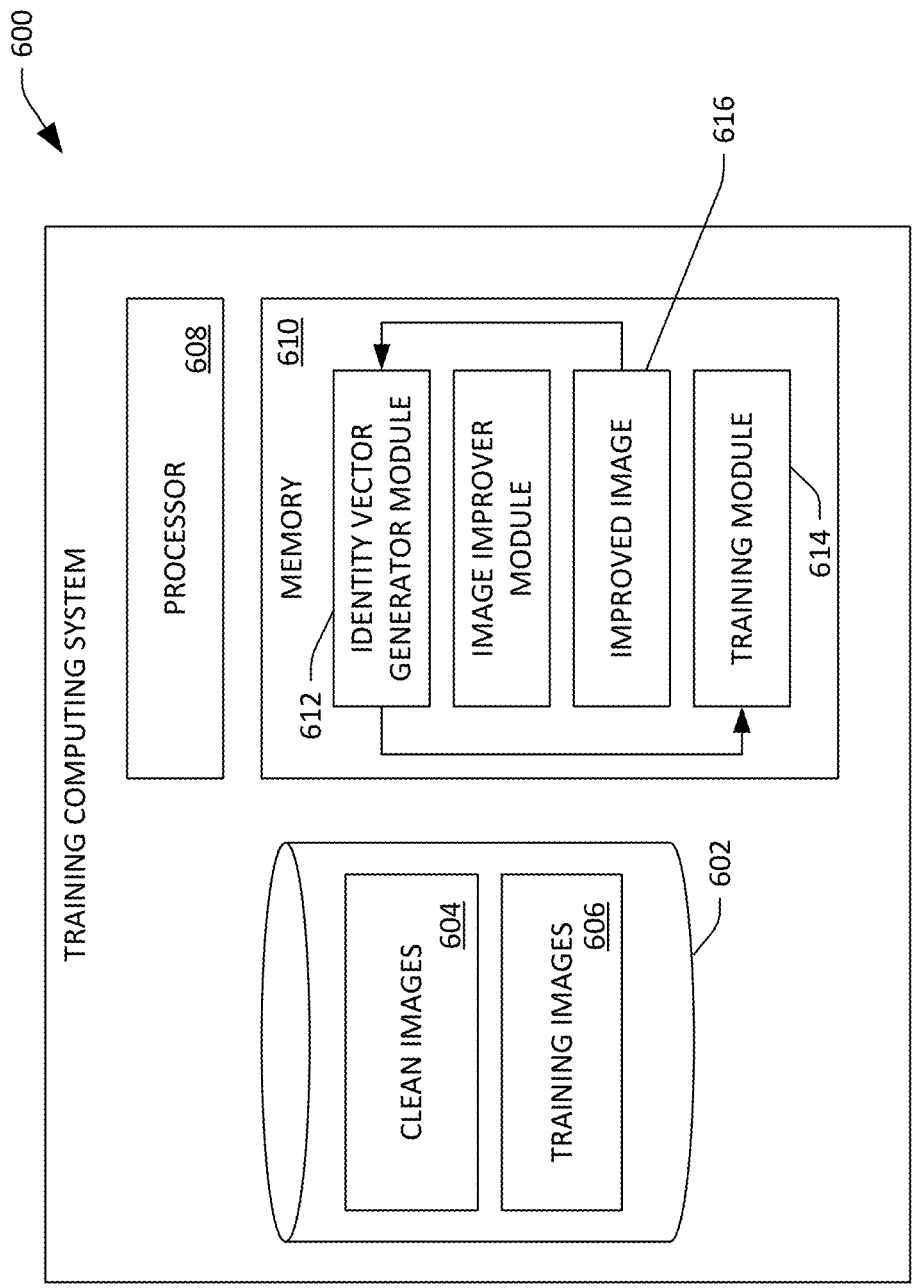
FIG. 6 is a functional block diagram of an exemplary computing system that is configured to train a computer-implemented module that is well-suited for simultaneously correcting for multiple different types of image degradation in an image.

Referring now to FIG. 6, a functional block diagram of a training computing system 600 that is configured to train the image improver module 112 is illustrated. The computing system 600 includes computer-readable storage 602 that comprises several clean images 604 of faces of several different people, where the clean images 604 are labeled to identify people whose faces are included in the clean images 604. The computer readable storage 602 also includes training images 606, where the training images 606 include one or more types of image degradation, but also include faces of the same people as captured in the clean images 604. The training images 606 may be the clean images 604 with some type of degradation added thereto. Alternatively, the clean images 604 may be the training images 606 with type(s) of image degradation removed therefrom.

The training computing system 600 further includes a processor 608 and memory 610 that includes instructions that are executed by the processor. The memory 610 includes an identity vector generator module 612 that is configured to generate identity vectors for different people whose faces are captured in the clean images 604. The training computing system 600 further includes a training module 614 that trains the image improver module 112 using a combination of three losses: L2-loss, perceptual loss (loss that is based upon differences between high-level image feature representations extracted from pretrained CNNs), and identity loss ($\mathcal{L}_{iden}$). L2-loss is computed between a restored lean face image $\hat{x}$ and a ground-truth image x, $\mathcal{L}_{mse}=\|\hat{x}-x\|_2^2$. With respect to perceptual loss, feature values extracted for $\hat{x}$ and x are denoted as $F^{\hat{x}}$ and $F^x$, respectively. Perceptual loss is then defined as follows:

$$\mathcal{L}_{per} = \frac{1}{NHW}\sum_i\sum_j\sum_k \|F^{\hat{x}} - F^x\|, \quad (8)$$

where N, H, and W are number of channels, height, and width of $F^{\hat{x}}$.

Identity loss can be defined as follows. Given a degraded image y and a corresponding set of clean images $\mathcal{D}_C$, {$F_i^C$} can be computed using a suitable algorithm for generating the identify vector 110. $\hat{x}$ is a restored clean facial image corresponding to y. The identity loss can be defined as follows:

$$\mathcal{L}_{iden} = \frac{1}{P}\sum_{\{F_i^C\}} \arccos(\langle F^{\hat{x}}, F_i^C\rangle) \quad (9)$$

where $F^{\hat{x}}$ are feature value extracted using $\hat{x}$ and P is a number of clean images in $\mathcal{D}_C$ (in the clean images 604) belonging to the same identity.

Thus, the identity loss with respect to an image can be computed by providing an improved image 616 to the identity vector generator module 610, which generates an identity vector for a face in the improved image 616. The training module 614 can train the image improver module 612 to minimize the overall loss (including the identity loss) based upon the identity vector for the face in the improved image 616.

The training module 614 can train the classifier module 116 and the encoders 118-120 based upon {y, x, c}. With more specificity, the classifier module 116 can be trained using {y, c}, where c is a vector of length three: c={b, n, l}, and further where b, n, and l are binary numbers (i.e., b, n, and l are only 1 if image y contains blur, noise, and lowlight degradation, respectively, and 0 otherwise. Training using {y, c} produces class label $\hat{c}$, which indicates degradations present in y.

The encoders 118-120 can be initially trained to address corresponding individual tasks of the blurring, denoising, and lowlight enhancement, respectively. Given a degraded image y, class $\hat{c}$, (output by classifier module 116), and an identity vector $l_{iden}$ as input to the encoders 118-120, the image improver module 112 outputs a restored face image $\hat{x}$. As noted above, in an example, the number of layers in each fusion cell is set to 12. The alpha's ($\alpha$) and the weights of the encoders 118-120 and the fusion module 122 can be updated alternately. The image improver module 112 can be trained using $\mathcal{L}_{final}$ with the Adam optimizer and batch size of 40. In an example, the learning rate is set to be 0.0005.

Figure 7:
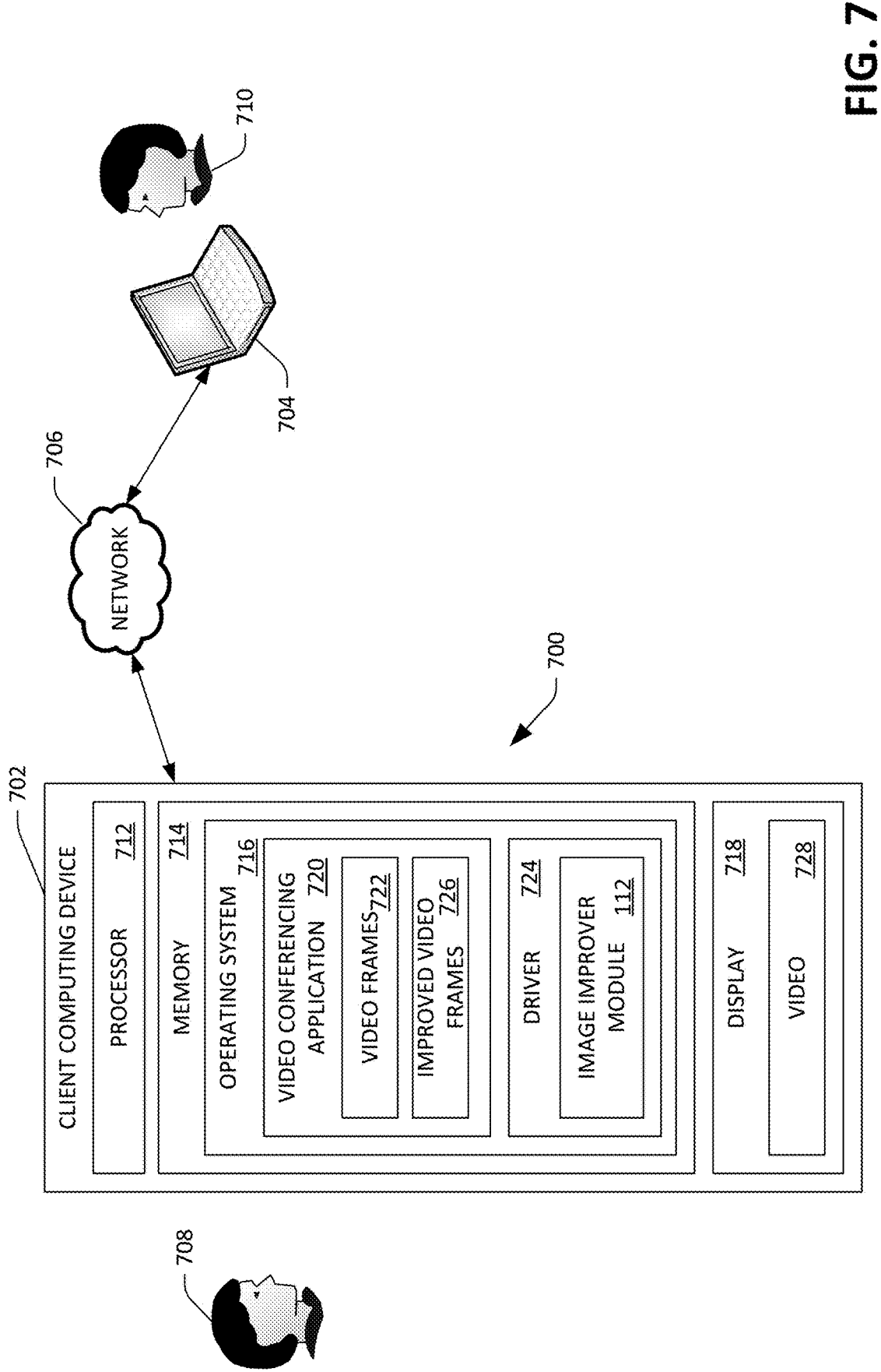
FIG. 7 is a functional block diagram of an exemplary system that is configured to improve each frame of a video generated during a videoconference.

Referring now to FIG. 7, a functional block diagram of an exemplary system 700 that supports videoconferencing is illustrated. The system 700 includes a first client computing device 702 and a second client computing device 704 that are in communication with one another by way of a network 706. A first user 708 operates the first client computing device 702 while a second user 710 operates the second client computing device 704. The first client computing device 702 includes a processor 712 and memory 714 that is operably coupled to the processor 712. The memory 714 includes an operating system 716, where applications installed on the client computing device 702 operate in conjunction with the operating system 716. The client computing device 702 further includes a display 718 upon which graphical data can be presented. In the exemplary system 700, the memory 714 includes a video conferencing application 720 that is executed by the processor 712. The videoconferencing application 720 is configured to receive video of the user 708 captured by a camera (not shown) and transmit the video to the second client computing device 704 by way of the network 706. Similarly, the second client computing device 704 captures video that includes images of the face of the second person user 710 and transmits video of the second user 710 to the first client computing device 702 by way of the network 706.

The operating system 716 has a driver 722 installed therein, where the driver 722 includes the image improver module 112. While the image improver module 112 is illustrated as being included in the driver 722, it is to be understood that the image improver module 112 may be included in the videoconferencing application, may be included in a kernel of the operating system 716, etc.

In an exemplary operation, the first client computing device 702 receives an identity vector for the second user 710. For instance, the second client computing device 704 may have the identity vector stored thereon or may have access to the identity vector, and the second client computing device 704 transmits the identity vector for the second user 710 to the first client computing device 702 by way of the network 706. Additionally, the first client computing device 702 can receive video that includes several video frames 724, wherein the frames include the face of the second user 710. Such video frames 724 are provided to the videoconferencing application 720, and the videoconferencing application 720 calls the driver 722 and directs each of the video frames 724 as well as the identity vector for the second user 710 to the driver 722. The image improver module 112 can simultaneously correct for multiple types of image degradation in each frame of the video frames 724 (as described above) and can return improved video frames 726 to the videoconferencing application 720. The videoconferencing application 720 may then display the improved video frames 726 on the display 718 as video 728. Thus, the videoconferencing application is able to depict the video 728, which includes higher quality frames than would otherwise be presented on the display 718.

Figure 8:
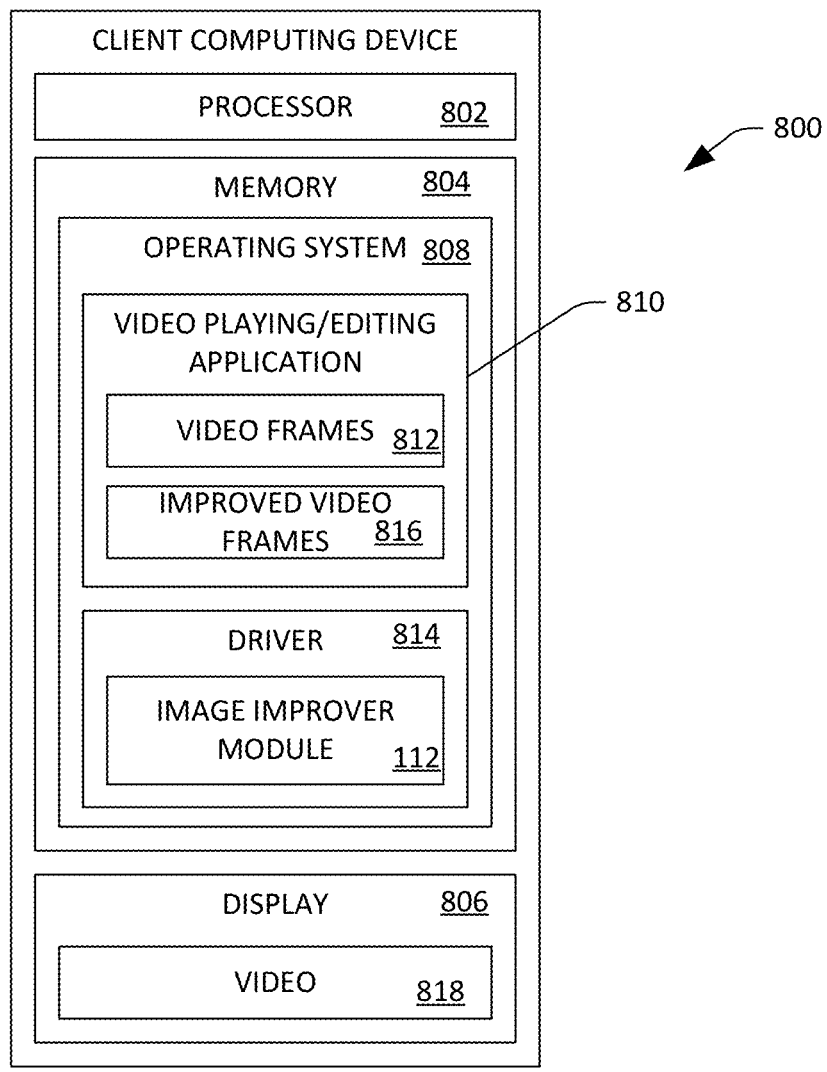
FIG. 8 is a functional block diagram of an exemplary client computing device that is configured to correct for multiple different types of image degradation in frames of a video.

Referring now to FIG. 8, a functional block diagram of an exemplary client computing device 800 is depicted. The client computing device 800 includes a processor 802 and memory 804 that is operably coupled to the processor 802. The client computing device 800 further includes a display 806 upon which graphical data is presented. The memory 804 of the client computing device 800 has an operating system 808 loaded therein, and a video playing/editing application 810 is executed by the processor 802 in conjunction with the operating system 808. The video playing/editing application 810 can access several video frames 812. Such video frames 812 may be a part of a home film, an older movie or television program, a video streamed from a streaming service, etc., where the video frames and 812 may include faces of different people.

The operating system data 808 has a driver 814 installed therein, where the driver 814 includes the image improver module 112. In another example, the image improver module 112 is included in the video playing/editing application 810. Upon the video playing/editing application 810 receives a request to play a video that includes the video frames 812, the video editing/playing application 810 calls the driver 814, and the video frames 812 are provided to the image improver module 112. The image improver module 112 denoises, deblurs, and improves degradations associated with low lighting conditions in the video frames 812 and generates improved video frames 816 as described above. These improved video frames 816 are then played by the video playing/editing application 810 on the display 806 as video 818.

While a few exemplary applications of the image improver module 112 have been set forth herein, it is to be understood that other applications are contemplated. For example, a user may have several images that were captured with older technology, and thus may have more noise, blur, etc. than what is desired by the user. The image improver module 112 can be provided with such images, and the image improver module 112 can output improved images (where the image improver module 112 deblurs, denoises, and corrects degradations associated with low lighting conditions). Other applications are also contemplated.

Figure 9:
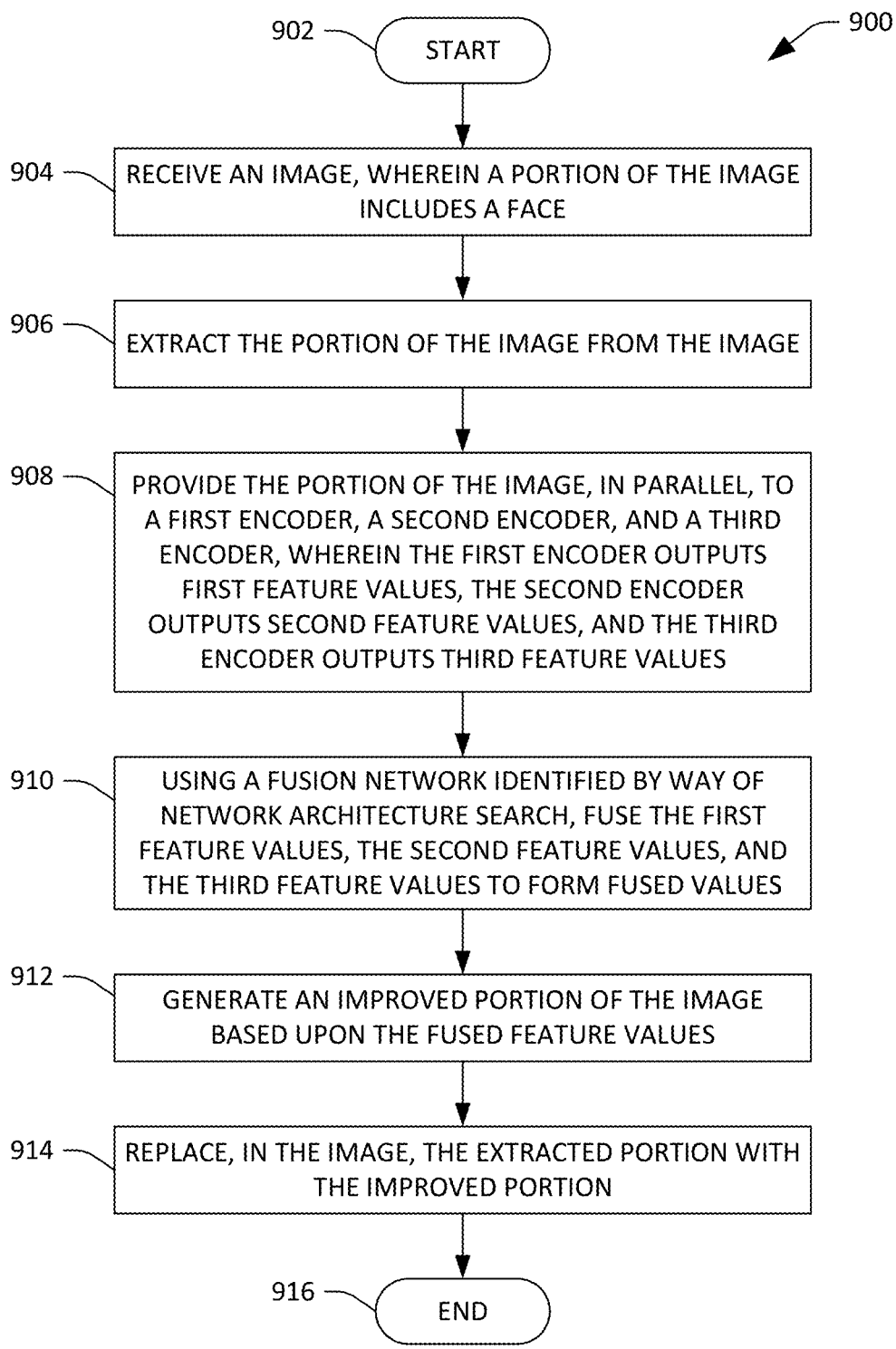
FIG. 9 is a flow diagram illustrating an exemplary methodology for simultaneously correcting for image degradations of multiple different types to generate an improved image.
Figure 10:
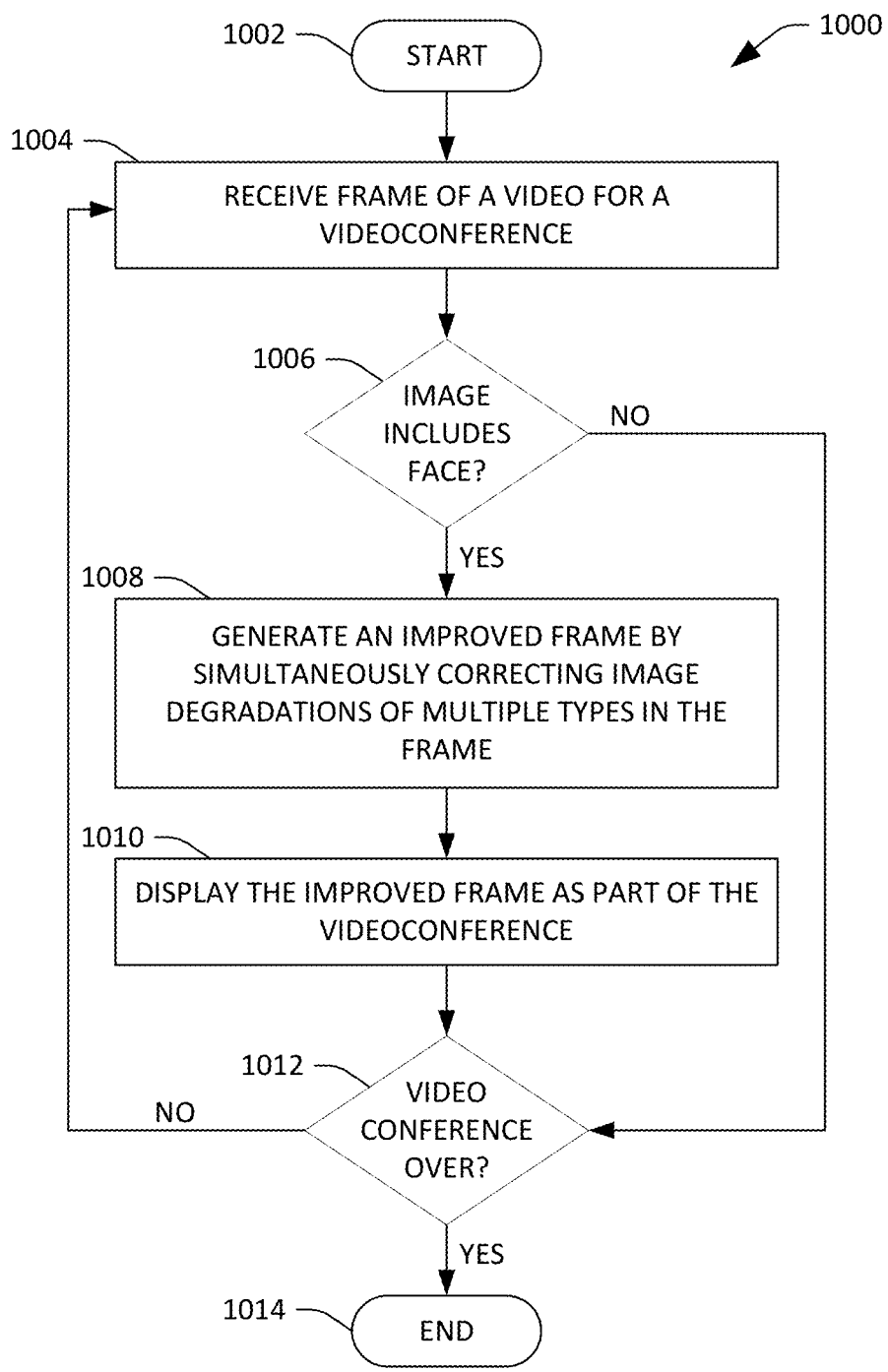
FIG. 10 is a flow diagram illustrating exemplary methodology for improving images generated during a videoconference.

FIGS. 9 and 10 illustrate exemplary methodologies relating to simultaneously correcting multiple different types of degradation in images. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now turning solely to FIG. 9, a flow diagram illustrating an exemplary methodology for improving images is illustrated. The methodology 900 starts at 902, and at 904 an image is received, where a portion of the image includes the face of a person. At 906, the portion of the image that includes the face is extracted from the image. In an example, the image is provided to a computer-implemented neural network that is configured to identify locations of faces in images and create bounding boxes around such faces. Such a neural network may be employed in connection with extracting the portion of the image that includes the face from the image.

At 908, the portion of the image is provided in parallel to a first encoder, a second encoder, and a third encode. As described previously, the first encoder outputs first feature values, the second encoder outputs second feature values, and the third encoder outputs third feature values. The first features may be features that are usable to correct for noise in the portion of the image, the second features may be usable to correct for blur in the portion of the image, and the third features may be usable to correct for poor lighting conditions when the image was captured.

At 910, using a fusion network identified by way of a network architecture search, the first feature values, the second feature values, and the third feature values are fused to form fused feature values. At 912, based upon the fused feature values, an improved portion of the image is generated, and at 914 the extracted portion of the image is replaced with the improved portion of the image in the image. The result, then, is that the face of the person in the improved image is deblurred, denoised, and has improved lighting conditions associated therewith when compared to the originally received image. The methodology 900 completes at 916.

With reference now to FIG. 10, a flow diagram illustrating an exemplary methodology 1000 for improving image frames generated during a videoconference is illustrated. The methodology 1000 starts at 1002, and at 1004 a frame of a video for a videoconference is received. At 1006, a determination is made regarding whether the video frame includes a face of a person; if it is determined at 1006 that the video frame includes a face of a person, then at 1008 an improved frame is generated by simultaneously correcting for image degradations of multiple different types in the frame. At 1010, the improved frame is displayed as part of the videoconference.

After the improved frame is displayed and/or upon the determination of 1006 that the frame fails to include a face, at 1012 a determination is made as to whether the videoconference has been completed. If the videoconference has not completed, the methodology 1000 returns to 1004, where a next frame of video is received. If the videoconference is determined to have completed at 1012, the methodology completes at 1014.

Various examples are now set forth.

Example 1: A computing system that is configured to simultaneously correct for multiple types of degradation in computer-readable images, the computing system comprises a processor and memory. The memory stores instructions that, when executed by the processor, cause the processor to perform acts comprising: providing a computer-readable image to a first encoder, the first encoder configured to output a first encoding of the computer-readable image that, when decoded, is configured to correct for a first type of image degradation in the computer-readable image; in parallel with providing the computer-readable image to the first encoder, providing the computer-readable image to a second encoder, the second encoder configured to output a second encoding of the computer-readable image that, when decoded, is configured to correct for a second type of image degradation in the computer-readable image; using a computer-implemented fusion network and based upon the first encoding of the computer-readable image and the second encoding of the computer-readable image, generating a fused encoding of the computer-readable image; and decoding the fused encoding of the computer-readable image to generate an improved computer-readable image, wherein the first type of image degradation and the second type of image degradation are simultaneously corrected during the decoding of the fused encoding of the computer-readable image.

Example 2: The computing system according to Example 1, the acts further comprising: in parallel with providing the computer-readable image to the first encoder and the second encoder, providing the computer-readable image to a third encoder, the third encoder configured to output a third encoding of the computer-readable image that, when decoded, is configured to correct for a third type of image degradation in the computer-readable image, wherein the fused encoding is based further upon the third encoding of the computer-readable image, and further wherein the first type of image degradation, the second type of image degradation, and the third type of image degradation are simultaneously corrected during the decoding of the fused encoding of the computer-readable image.

Example 3: The computing system according to Example 2, wherein the first type of image degradation is blur, the second type of image degradation is noise, and the third type of image degradation is low lighting when the computer-readable image was captured by a camera.

Example 4: The computing system according to any of Examples 1-3, the acts further comprising: prior to providing the computer-readable image to the first encoder and the second encoder, determining that the computer-readable image includes the face of the person, Wherein the computer-readable image is provided to the first encoder and the second encoder only upon determining that the computer-readable image includes the face of the person.

Example 5: The computing system according to Example 4, the acts further comprising: receiving an identity vector for the person, the identity vector comprises values that are representative of features of the face of the person, wherein the first encoder generates the first encoding of the computer-readable image based upon the identity vector, and further wherein the second encoder generates the second encoding of the computer-readable image based upon the identity vector.

Example 6: The computing system according to Example 5, the acts further comprising: generating the identity vector based upon a plurality of images that include the face of the person.

Example 7: The computing system according to any of Examples 1-6, the acts further comprising: prior to providing the computer-readable image to the first encoder and the second encoder, providing the computer-readable image to a classifier, wherein the classifier, based upon the computer-readable image, outputs: a first value that is indicative of an amount of image degradation of the first type of image degradation in the computer-readable image; and a second value that is indicative of an amount of image degradation of the second type of image degradation in the computer-readable image, wherein the first encoding of the computer-readable image is based upon the first value and the second encoding of the computer-readable image is based upon the second value.

Example 8: The computing system according to any of Examples 1-7, wherein the computer-readable image is a frame of video generated during a live video teleconference, and wherein the acts of providing, providing, using, and decoding are performed on each frame in the video.

Example 9: The computing system according to any of Examples 1-8, wherein the fusion network comprises multiple repeatable cells, wherein each cell comprises two layers, and further wherein outputs of the two layers are directed to a tensor.

Example 10: The computing system according to any of Examples 1-9 being a client computing device that executes a videoconferencing application, wherein the image is received by the videoconferencing application from a second client computing device over a network connection between the client computing device and the second client computing device.

Example 11: The computing system according to any of Examples 1-10 being a client computing device that executes a videoconferencing application, wherein the image is generated by a camera of the client computing device, the acts further comprising transmitting the improved computer-readable image to a second client computing device that is in network communication with the client computing device as part of a videoconference facilitated by the video conferencing application.

Example 12: A method performed by at least one processor of a computing system, the method comprising: receiving a computer-readable image of a face of a person, wherein the computer-readable image of the face of the person comprises image degradations for: noise in the computer-readable image; blur in the computer-readable image; and lighting conditions when the computer-readable image was captured; and simultaneously correcting the image degradations to generate an improved computer-readable image, wherein the image degradations for noise, blur, and lighting conditions are each at least partially corrected in the computer-readable image.

Example 13: The method according to Example 12, wherein simultaneously correcting the image degradations to generate the improved computer-readable image comprises: providing the computer-readable image to a first encoder, wherein the first encoder outputs a first encoding of the computer-readable image based upon the computer-readable image, and further wherein the first encoding encodes a first correction to be made to the computer-readable image to correct for the noise in the computer-readable image; in parallel with providing the computer-readable image to the first encoder, providing the computer-readable image to a second encoder, wherein the second encoder outputs a second encoding of the computer-readable image based upon the computer-readable image, and further wherein the second encoding encodes a second correction to be made to the computer-readable image to correct for the blur in the computer-readable image; in parallel with providing the computer-readable image to the first encoder and the second encoder, providing the computer-readable image to a third encoder, wherein the third encoder outputs a third encoding of the computer-readable image based upon the computer-readable image, and further wherein the third encoding encodes a third correction to be made to the computer-readable image to correct for the lighting conditions when the computer-readable image was captured; fusing the first encoding, the second encoding, and the third encoding to form a fused encoding of the computer-readable image; and decoding the fused encoding to generate the improved computer-readable image.

Example 14: The method according to any of Examples 12-13, further comprising: receiving an identity vector for the face of the person, wherein the identity vector comprises values that invariantly represent features of the face of the person, wherein the improved computer-readable image is generated based upon the identity vector for the face of the person.

Example 15: The method according to any of Examples 12-14, further comprising: providing the computer-readable image to a classifier, wherein the classifier is configured to output a first value that is indicative of a magnitude of image degradation associated with noise in the computer-readable image, a second value that is indicative of a magnitude of image degradation associated with blur in the computer-readable image, and a third value that is indicative of a magnitude of image degradation associated with lighting conditions in the computer-readable image, wherein the image degradations are simultaneously corrected based upon the first value, the second value, and the third value output by the classifier.

Example 16: The method according to any of Examples 12-15, wherein the computer-readable image is a frame of a video, and further wherein the acts of receiving and simultaneously correcting are performed on each frame of the video in real-time.

Example 17: The method according to Example 16, wherein the computing system is a server computing device that receives the video from a client computing device that is in network communication with the computing system.

Example 18: A computer-readable storage medium comprising instructions that, when executed by a processor, cause the processor to perform acts comprising: providing a computer-readable image to a first encoder, the first encoder configured to output a first encoding of the computer-readable image that, when decoded, is configured to correct for a first type of image degradation in the computer-readable image; in parallel with providing the computer-readable image to the first encoder, providing the computer-readable image to a second encoder, the second encoder configured to output a second encoding of the computer-readable image that, when decoded, is configured to correct for a second type of image degradation in the computer-readable image; using a computer-implemented fusion network and based upon the first encoding of the computer-readable image and the second encoding of the computer-readable image, generating a fused encoding of the computer-readable image; and decoding the fused encoding of the computer-readable image to generate an improved computer-readable image, wherein the first type of image degradation and the second type of image degradation are simultaneously corrected during the decoding of the fused encoding of the computer-readable image.

Example 19: The computer-readable storage medium according to Example 18, the acts further comprising: in parallel with providing the computer-readable image to the first encoder and the second encoder, providing the computer-readable image to a third encoder, the third encoder configured to output a third encoding of the computer-readable image that, when decoded, is configured to correct for a third type of image degradation in the computer-readable image, wherein the fused encoding is based further upon the third encoding of the computer-readable image, and further wherein the first type of image degradation, the second type of image degradation, and the third type of image degradation are simultaneously corrected during the decoding of the fused encoding of the computer-readable image.

Example 20: The computer-readable storage medium according to Example 19, wherein the first type of image degradation is blurring, the second type of image degradation is noise, and the third type of image degradation is low lighting when the computer-readable image was captured by a camera.

Example 21: A computing system configured to perform a method according to any of Examples 12-17.

Example 22: A computing system configured with the computer-readable storage medium of any of Examples 18-20.

Figure 11:
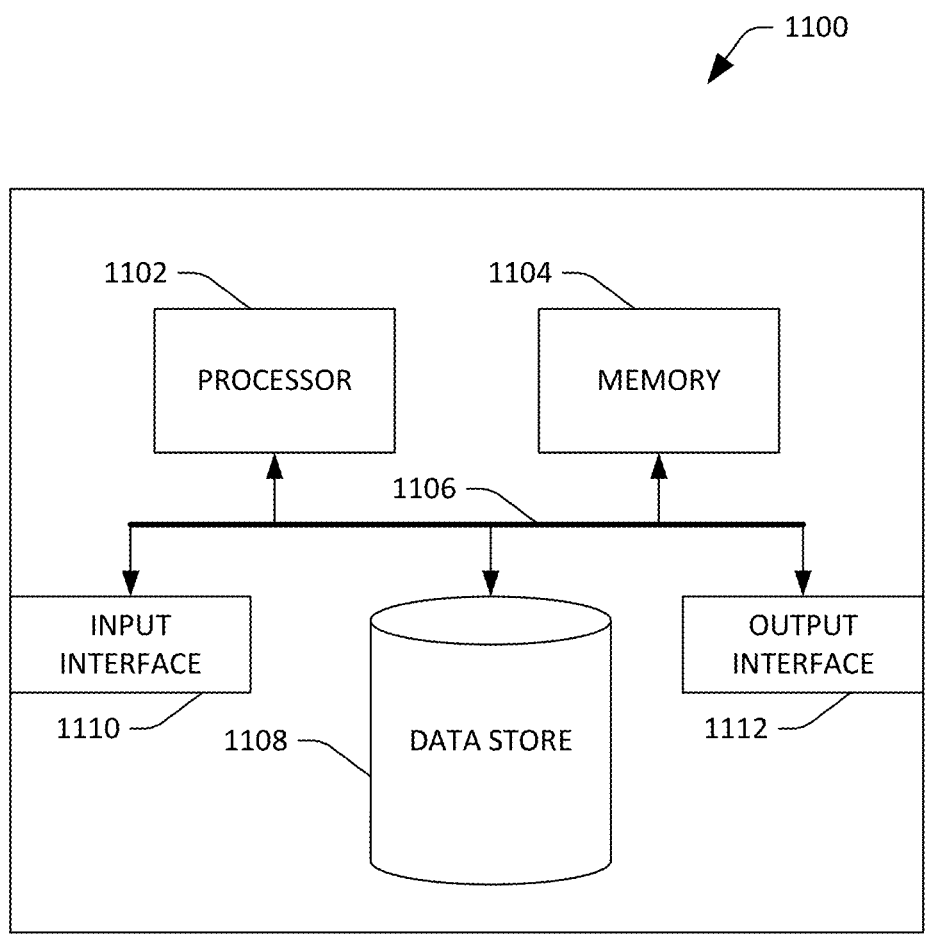
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that is configured to simultaneously correct image degradations of multiple types in an image. By way of another example, the computing device 1100 can be used in a system that supports computer-implemented videoconferencing. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store identity vectors, images, feature values, video, etc.

The computing device 1100 additionally includes a data store 1108 that is accessible by the processor 1102 by way of the system bus 1106. The data store 1108 may include executable instructions, images, identity vectors, video, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to simultaneously correct for multiple types of degradation in computer-readable images, the computing system comprising:
   a processor; and
   memory storing instructions that, when executed by the processor, cause the processor to perform acts comprising:
   receiving an identity vector for a face of a person, wherein the identify vector comprises values that represent features of the face of the person;
   providing a computer-readable image that includes the face of the person to a first encoder, the first encoder configured to output a first encoding of the computer-readable image that, when decoded, is configured to correct for a first type of image degradation in the computer-readable image;
   in parallel with providing the computer-readable image to the first encoder, providing the computer-readable image to a second encoder, the second encoder configured to output a second encoding of the computer-readable image that, when decoded, is configured to correct for a second type of image degradation in the computer-readable image, wherein at least one of the first encoding or the second encoding is based upon the identity vector for the face of the person;
   using a computer-implemented fusion network and based upon the first encoding of the computer-readable image and the second encoding of the computer-readable image, generating a fused encoding of the computer-readable image; and
   decoding the fused encoding of the computer-readable image to generate an improved computer-readable image, wherein the first type of image degradation and the second type of image degradation are simultaneously corrected during the decoding of the fused encoding of the computer-readable image.

2. The computing system of claim 1, the acts further comprising:
   in parallel with providing the computer-readable image to the first encoder and the second encoder, providing the computer-readable image to a third encoder, the third encoder configured to output a third encoding of the computer-readable image that, when decoded, is configured to correct for a third type of image degradation in the computer-readable image, wherein the fused encoding is based further upon the third encoding of the computer-readable image, and further wherein the first type of image degradation, the second type of image degradation, and the third type of image degradation are simultaneously corrected during the decoding of the fused encoding of the computer-readable image.

3. The computing system of claim 2, wherein the first type of image degradation is blur, the second type of image degradation is noise, and the third type of image degradation is low lighting when the computer-readable image was captured by a camera.

4. The computing system of claim 1, the acts further comprising:
   prior to providing the computer-readable image to the first encoder and the second encoder, determining that the computer-readable image includes the face of the person, wherein the computer-readable image is provided to the first encoder and the second encoder only upon determining that the computer-readable image includes the face of the person.

5. The computing system of claim 1,
   wherein the first encoder generates the first encoding of the computer-readable image based upon the identity vector, and further wherein the second encoder generates the second encoding of the computer-readable image based upon the identity vector.

6. The computing system of claim 5, the acts further comprising:
generating the identity vector based upon a plurality of images that include the face of the person.

7. The computing system of claim 1, the acts further comprising:
prior to providing the computer-readable image to the first encoder and the second encoder, providing the computer-readable image to a classifier, wherein the classifier, based upon the computer-readable image, outputs:
a first value that is indicative of an amount of image degradation of the first type of image degradation in the computer-readable image; and
a second value that is indicative of an amount of image degradation of the second type of image degradation in the computer-readable image, wherein the first encoding of the computer-readable image is based upon the first value and the second encoding of the computer-readable image is based upon the second value.

8. The computing system of claim 1, wherein the computer-readable image is a frame of video generated during a live video teleconference, and wherein the acts of providing, providing, using, and decoding are performed on each frame in the video.

9. The computing system of claim 1, wherein the fusion network comprises multiple repeatable cells, wherein each cell comprises two layers, and further wherein outputs of the two layers are directed to a tensor.

10. The computing system of claim 1 being a client computing device that executes a videoconferencing application, wherein the image is received by the videoconferencing application from a second client computing device over a network connection between the client computing device and the second client computing device.

11. The computing system of claim 1 being a client computing device that executes a videoconferencing application, wherein the image is generated by a camera of the client computing device, the acts further comprising transmitting the improved computer-readable image to a second client computing device that is in network communication with the client computing device as part of a videoconference facilitated by the video conferencing application.

12. A method performed by at least one processor of a computing system, the method comprising:
receiving an identity vector for a face of a person, wherein the identify vector comprises values that invariantly represent features of the face of the person;
receiving a computer-readable image of the face of the person, wherein the computer-readable image of the face of the person comprises image degradations for:
noise in the computer-readable image;
blur in the computer-readable image; and
lighting conditions when the computer-readable image was captured; and
based upon the identity vector for the face of the person, simultaneously correcting the image degradations to generate an improved computer-readable image, wherein the image degradations for noise, blur, and lighting conditions are each at least partially corrected in the computer-readable image.

13. The method of claim 12, wherein simultaneously correcting the image degradations to generate the improved computer-readable image comprises:
providing the computer-readable image to a first encoder, wherein the first encoder outputs a first encoding of the computer-readable image based upon the computer-readable image, and further wherein the first encoding encodes a first correction to be made to the computer-readable image to correct for the noise in the computer-readable image;
in parallel with providing the computer-readable image to the first encoder, providing the computer-readable image to a second encoder, wherein the second encoder outputs a second encoding of the computer-readable image based upon the computer-readable image, and further wherein the second encoding encodes a second correction to be made to the computer-readable image to correct for the blur in the computer-readable image;
in parallel with providing the computer-readable image to the first encoder and the second encoder, providing the computer-readable image to a third encoder, wherein the third encoder outputs a third encoding of the computer-readable image based upon the computer-readable image, and further wherein the third encoding encodes a third correction to be made to the computer-readable image to correct for the lighting conditions when the computer-readable image was captured;
fusing the first encoding, the second encoding, and the third encoding to form a fused encoding of the computer-readable image; and
decoding the fused encoding to generate the improved computer-readable image.

14. The method of claim 12, further comprising:
providing the computer-readable image to a classifier, wherein the classifier is configured to output a first value that is indicative of a magnitude of image degradation associated with noise in the computer-readable image, a second value that is indicative of a magnitude of image degradation associated with blur in the computer-readable image, and a third value that is indicative of a magnitude of image degradation associated with lighting conditions in the computer-readable image, wherein the image degradations are simultaneously corrected based upon the first value, the second value, and the third value output by the classifier.

15. The method of claim 12, wherein the computer-readable image is a frame of a video, and further wherein the acts of receiving and simultaneously correcting are performed on each frame of the video in real-time.

16. The method of claim 15, wherein the computing system is a server computing device that receives the video from a client computing device that is in network communication with the computing system.

17. A computer-readable storage medium comprising instructions that, when executed by a processor, cause the processor to perform acts comprising:
receiving an identity vector for a face of a person, wherein the identify vector comprises values that represent features of the face of the person;
providing a computer-readable image that includes the face of the person to a first encoder, the first encoder configured to output a first encoding of the computer-readable image that, when decoded, is configured to correct for a first type of image degradation in the computer-readable image;
in parallel with providing the computer-readable image to the first encoder, providing the computer-readable image to a second encoder, the second encoder configured to output a second encoding of the computer-readable image that, when decoded, is configured to correct for a second type of image degradation in the computer-readable image, wherein at least one of the first encoding or the second encoding is based upon the identity vector for the face of the person;

using a computer-implemented fusion network and based upon the first encoding of the computer-readable image and the second encoding of the computer-readable image, generating a fused encoding of the computer-readable image; and decoding the fused encoding of the computer-readable image to generate an improved computer-readable image, wherein the first type of image degradation and the second type of image degradation are simultaneously corrected during the decoding of the fused encoding of the computer-readable image.

18. The computer-readable storage medium of claim 17, the acts further comprising:

in parallel with providing the computer-readable image to the first encoder and the second encoder, providing the computer-readable image to a third encoder, the third encoder configured to output a third encoding of the computer-readable image that, when decoded, is configured to correct for a third type of image degradation in the computer-readable image, wherein the fused encoding is based further upon the third encoding of the computer-readable image, and further wherein the first type of image degradation, the second type of image degradation, and the third type of image degradation are simultaneously corrected during the decoding of the fused encoding of the computer-readable image.

19. The computer-readable storage medium of claim 18, wherein the first type of image degradation is blurring, the second type of image degradation is noise, and the third type of image degradation is low lighting when the computer-readable image was captured by a camera.

20. The computer-readable storage medium of claim 17, wherein the first encoder generates the first encoding of the computer-readable image based upon the identity vector, and further wherein the second encoder generates the second encoding of the computer-readable image based upon the identity vector.

* * * * *